United States Patent
Sudbrink et al.

(10) Patent No.: US 10,314,227 B2
(45) Date of Patent: Jun. 11, 2019

(54) FERTILIZER KNIFE

(71) Applicant: 360 Yield Center, LLC, Morton, IL (US)

(72) Inventors: Matthew Sudbrink, Metamora, IL (US); Nowell Moore, Congerville, IL (US)

(73) Assignee: 360 Yield Center, LLC, Morton, IL (US)

( * ) Notice: Subject to any disclaimer, the term of this patent is extended or adjusted under 35 U.S.C. 154(b) by 0 days.

(21) Appl. No.: 15/418,699

(22) Filed: Jan. 28, 2017

(65) Prior Publication Data
US 2017/0215335 A1 Aug. 3, 2017

Related U.S. Application Data

(60) Provisional application No. 62/289,181, filed on Jan. 29, 2016.

(51) Int. Cl.
*A01C 5/06* (2006.01)
*A01C 23/02* (2006.01)

(52) U.S. Cl.
CPC ............ *A01C 23/024* (2013.01); *A01C 5/062* (2013.01)

(58) Field of Classification Search
CPC .. A01C 5/062; A01C 5/06; A01C 5/00; A01C 23/024; A01C 23/023; A01C 23/02; A01C 23/00
See application file for complete search history.

(56) References Cited

U.S. PATENT DOCUMENTS 7,523,709 B1   4/2009 Kiest
8,667,916 B1   3/2014 Kiest

OTHER PUBLICATIONS

XLPAT Labs, "NH3 Knife", Index, Oct. 11, 2016, pp. 1-12.

*Primary Examiner* — Christopher J. Novosad
(74) *Attorney, Agent, or Firm* — Thomas J. Oppold; Larkin Hoffman Daly & Lindgren, Ltd.

(57) ABSTRACT

A fertilizer knife for applying fertilizer to soil. The fertilizer knife includes a knife body having a primary chamber through a rearward end thereof. Fins diverge laterally outwardly from a tip at a lower forward end of the knife body and curve upwardly from the lower forward end, terminating above a discharge end of the primary chamber. Liquid from a liquid source is communicated to the primary chamber and is discharged from the discharge end into the furrow formed by the fertilizer knife. In another embodiment, a secondary passage through the knife body communicates gas from a gas supply into a gap surrounding a supply tube disposed within the primary chamber. In another embodiment flow controllers disposed on the knife regulate liquid into the primary chamber and gas into the secondary passage.

11 Claims, 15 Drawing Sheets

FERTILIZER KNIFE

BACKGROUND

Farmers are increasingly recognizing the importance of fertilizer application in maximizing yield and profit in the cultivation of corn and other crops. Thus there is a need in the art for improved systems and methods for controlling and monitoring placement and application of nitrogen fertilizers, including anhydrous ammonia.

DESCRIPTION

Figure 1:
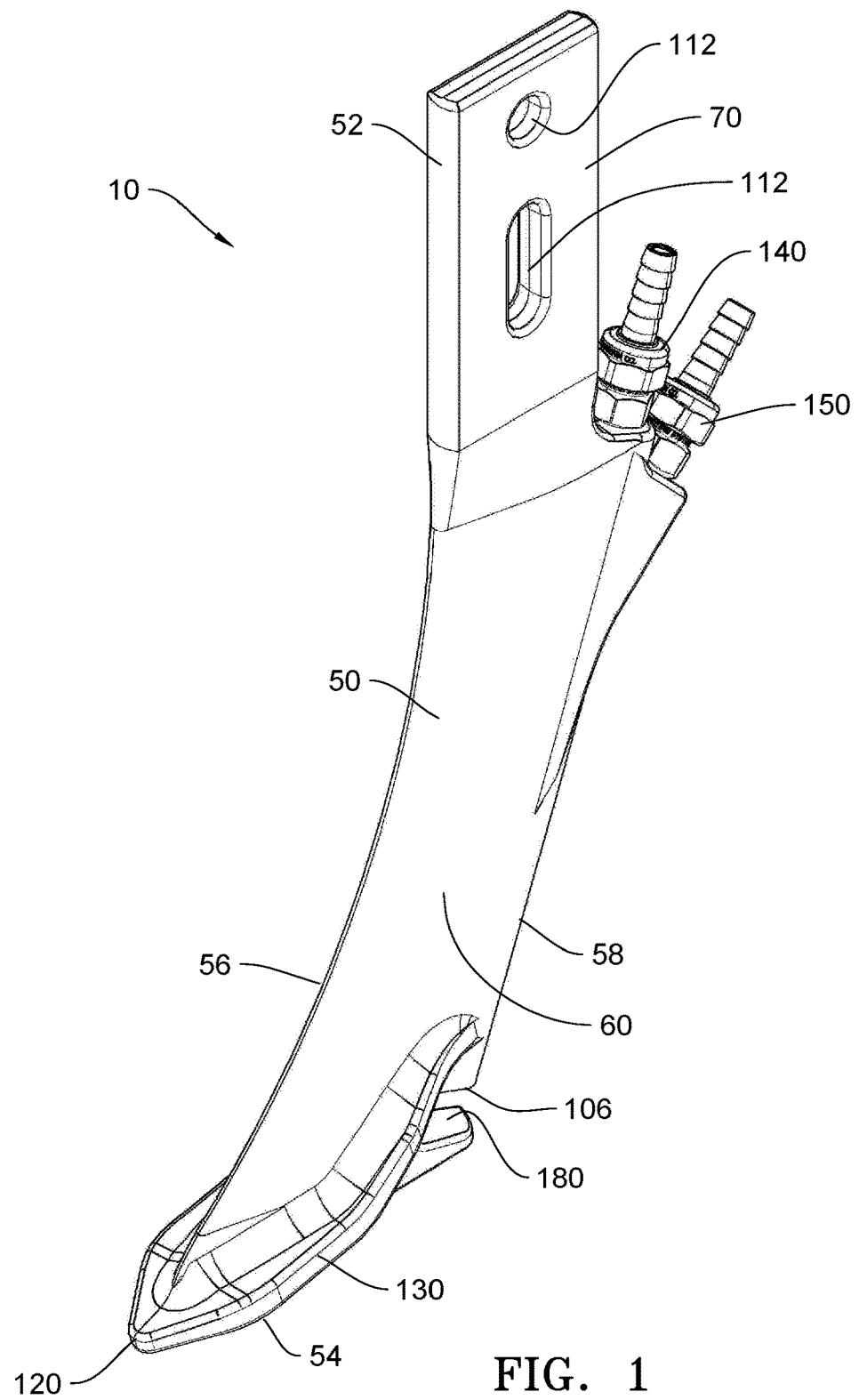
FIG. 1 is a front perspective view of an embodiment of a fertilizer knife.
Figure 2:
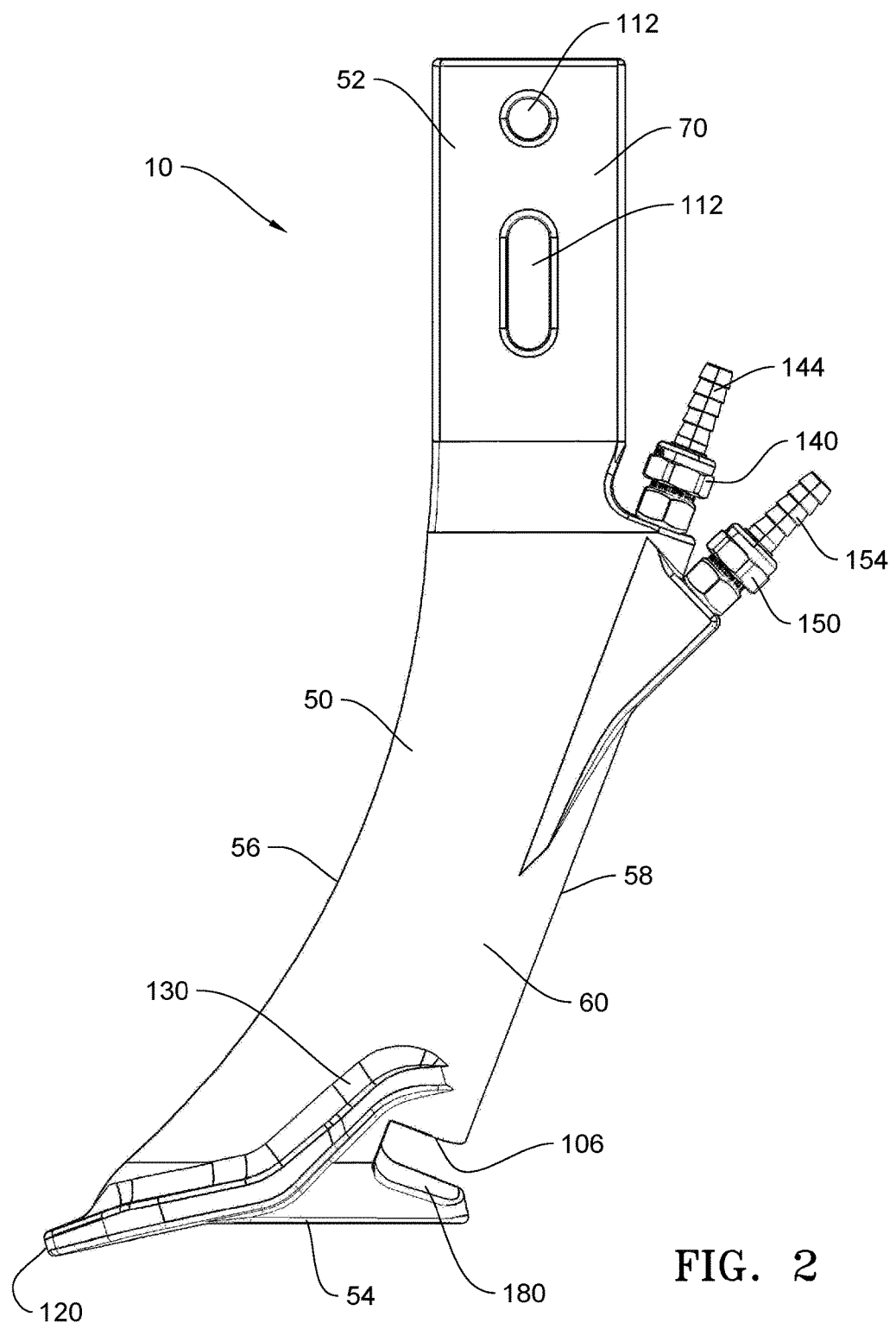
FIG. 2 is a side view of the knife of FIG. 1.
Figure 3:
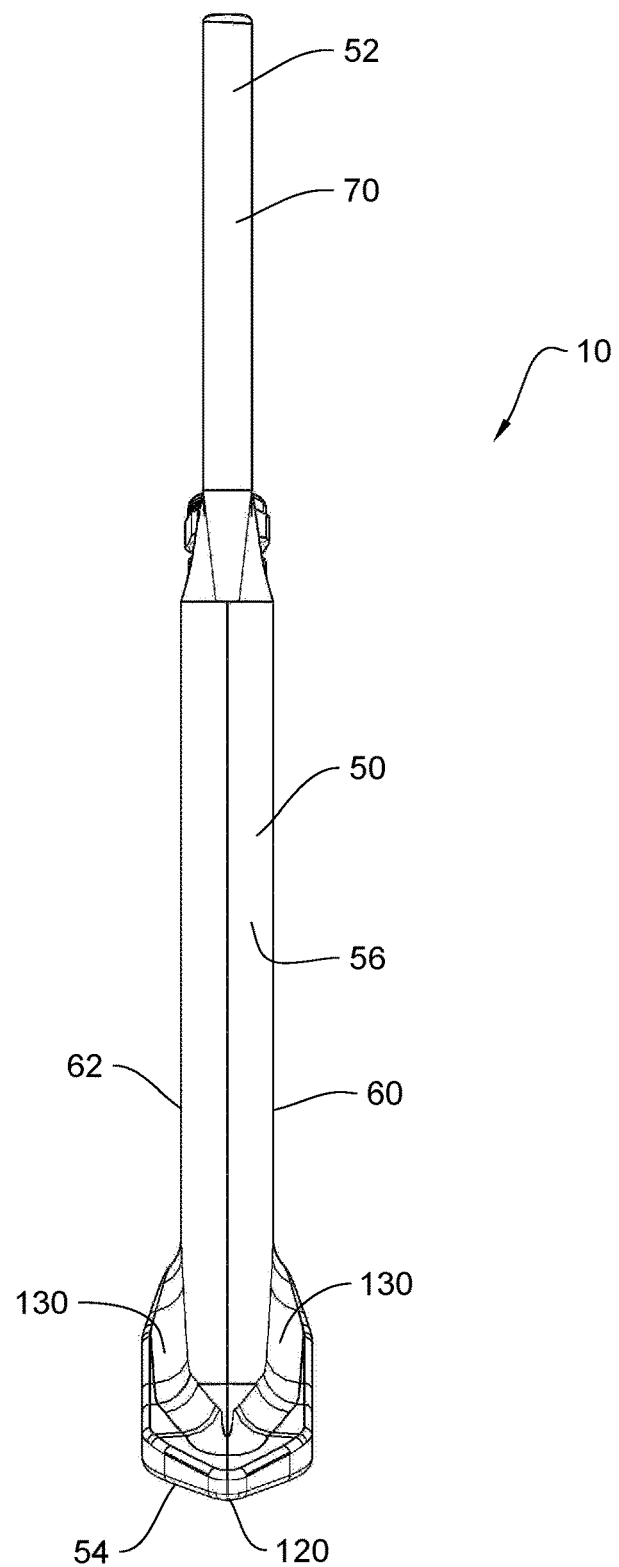
FIG. 3 is a front view of the knife of FIG. 1.
Figure 4:
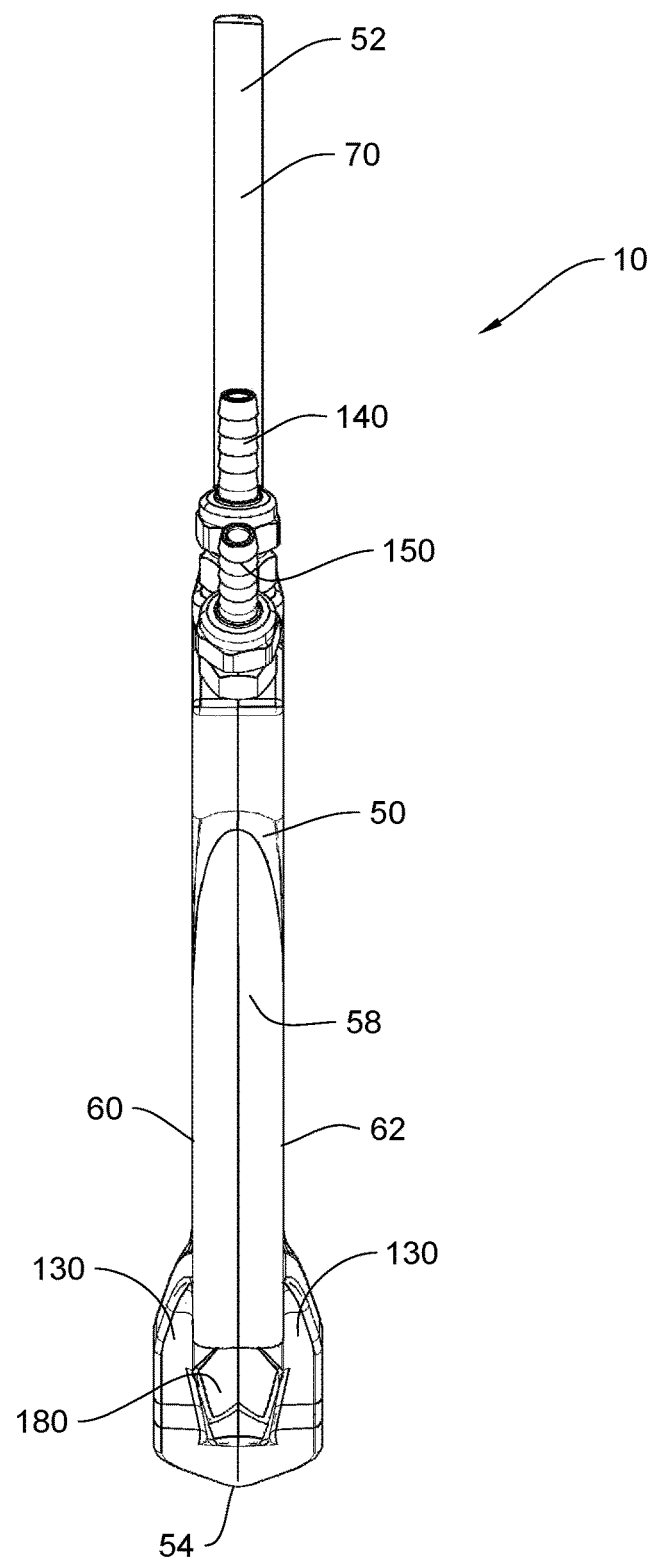
FIG. 4 is a rear view of the knife of FIG. 1.
Figure 5:
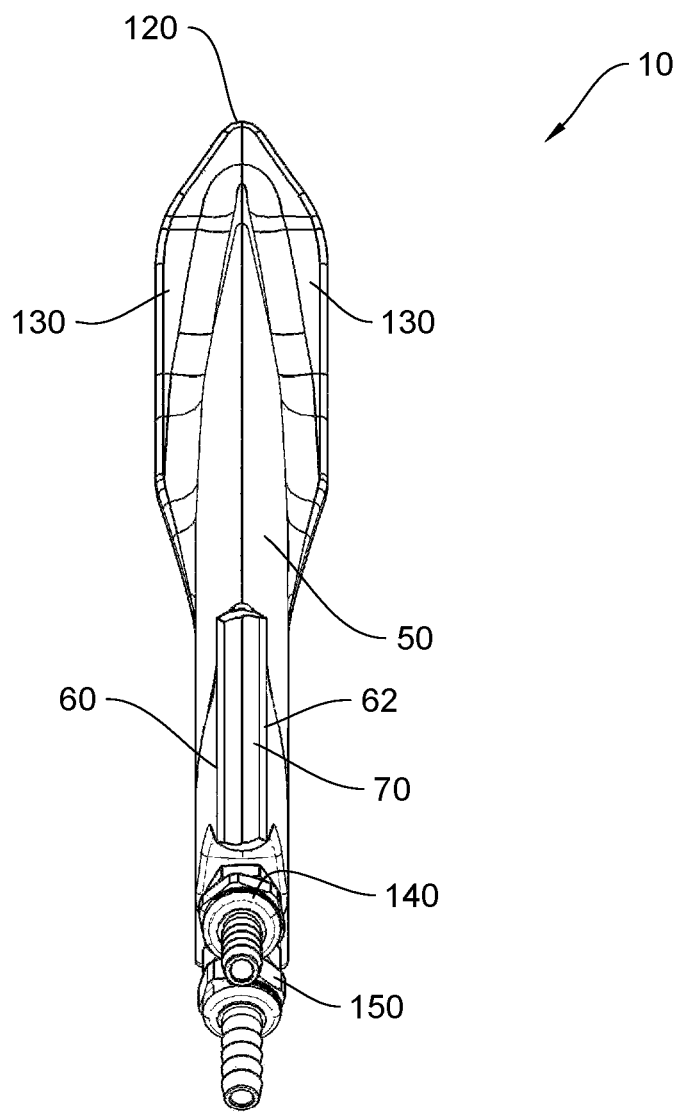
FIG. 5 is a top plan view of the knife of FIG. 1.
Figure 6:
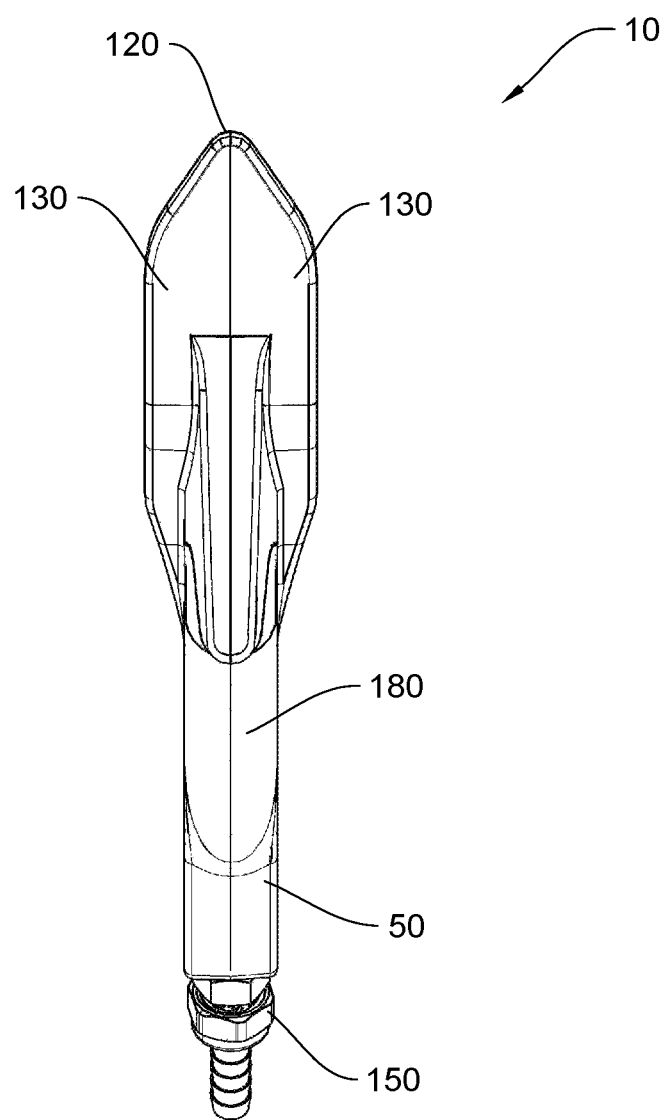
FIG. 6 is a bottom plan view of the knife of FIG. 1.

Referring now to the drawings wherein like reference numerals designate the same or corresponding parts throughout the several views, FIGS. 1-6 illustrate one embodiment of a fertilizer knife 10 for use in applying liquid fertilizer to a soil surface. It should be appreciated that the fertilizer knife 10 is one of a plurality of fertilizer knives that would be disposed in laterally spaced relation across the width of tillage implement or fertilizing implement (not shown).

The fertilizer knife 10 includes a knife body 50 having an upper end 52 and a lower end 54, a forward end 56, a rearward end 58 and opposing sides 60, 62. The upper end 52 includes a mounting portion 70 adapted for mounting in a conventional manner to a shank (not shown) supported by the toolbar or beam of the tillage implement, such as by bolts or other connectors extending through apertures 112 in the mounting portion 70 and through mating apertures in the shank. The knife body 50 includes a point 120 at the forward lower end 54. Fins 130 begin at the point 120 and extend along each of the sides 60, 62 of the knife body 50 diverging laterally outwardly toward the rearward end of the knife body 50. Along each of the sides 60, 62, the fins 130 curve upwardly before terminating above a discharge end 106 of the primary chamber 100, the purpose of which is described later. A liquid deflector 180 is positioned at the lower, rearward end 58 of the knife body 50 below the discharge end 106 of the primary chamber 100, the purpose of which is described later.

Figure 7:
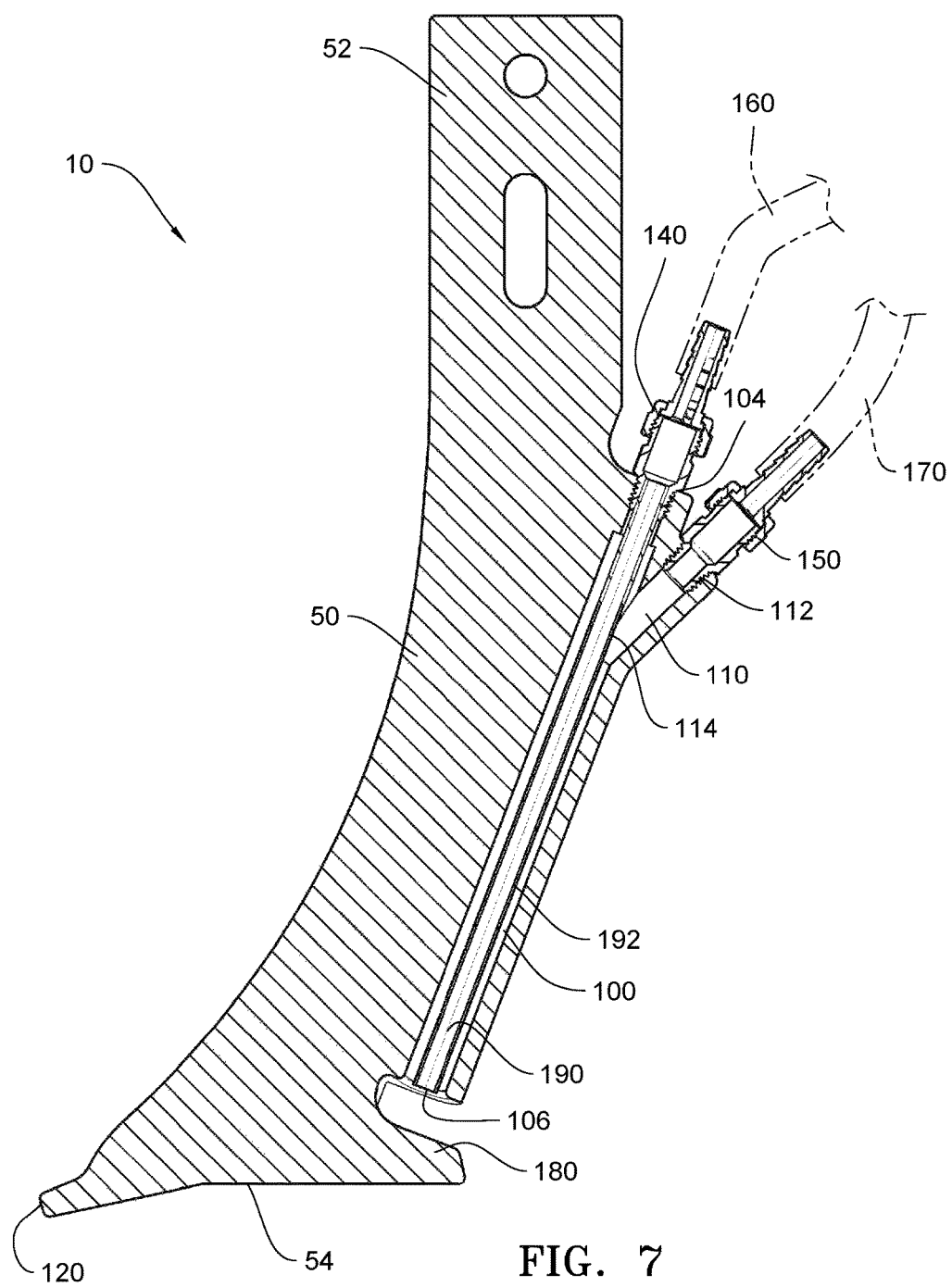
FIG. 7 is a cross-sectional view of the knife of FIG. 1.

As best viewed in FIG. 7, which is a cross-sectional view along the vertical axis of the knife body 50, a primary chamber 100 extends downwardly through the rearward end 58 of the knife body 50 defining chamber walls 102. The primary chamber 100 has an input port 104 and a discharge end 106. A secondary passage 110 branches off from the primary passage 100 through the knife body 50. The secondary passage 110 includes an input port 112 and an outlet end 114 in communication with the primary passage 100. The primary chamber 100 and the secondary passage 110 may be cast, bored or otherwise formed integrally into the knife body 50.

Figure 15:
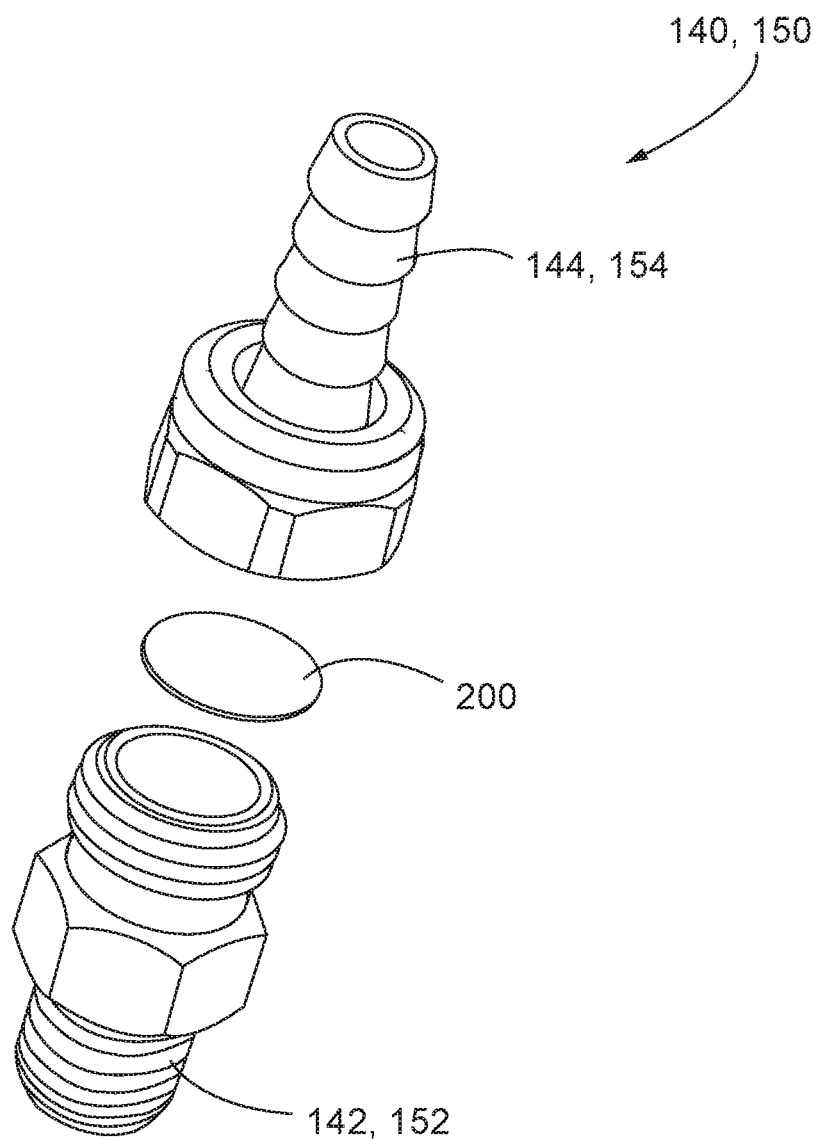
FIG. 15 is an exploded view of an embodiment of an orifice disc and associated fittings of a knife.

Positioned rearwardly on knife body 50 are respective liquid and gaseous ammonia fittings 140, 150 that respectively couple to liquid supply line 160 and gas supply line 170 (FIG. 7), which communicate the anhydrous ammonia from a supply source (not shown). Referring to FIG. 15, which is an exploded perspective view of the fittings 140, 150, the fittings 140, 150 include externally threaded male end 142, 152 which is threadably received into the internally threaded input ports 104, 114 of the respective primary chamber 100 and secondary passage 110. Each of the fittings 140, 150 include a hose barb 144, 154 at the other end for coupling to the respective liquid and gaseous ammonia supply lines 160, 170 of an anhydrous ammonia supply system, such as disclosed in U.S. Pat. No. 8,667,916, which is incorporated by reference in its entirety.

In operation, the knife 10 is lowered into the soil and as the implement s drawn forward through the field by a tractor in the direction of arrow 12. The point 120 and fin 130 together define a smooth, rounded surface that fractures and lifts the soil as the knife is drawn through the field creating the open furrow. The upward curve of the fins 130 serves to lift the soil up so the soil is directed above the liquid exiting from the discharge end 106 of the primary chamber 100, thereby minimizing soil coming into contact with the discharge end 106 of the primary chamber 100 which is known to cause the soil to freeze around the discharge end of conventional anhydrous ammonia liquid applicator knives. Those of skill in the art recognize that when soil freezes to the knife, it can adversely affect uniform application of the anhydrous ammonia and it presents a potential safety hazard for the operator by inhaling the ammonia as he attempts to break away the frozen soil from the knife. Additionally the liquid deflector 180 acts to split and direct the liquid stream exiting from the discharge end 106 of the primary chamber 100 into two liquid streams. In this manner, the liquid is directed into bands on both sides of the open furrow.

As shown in FIG. 15, the liquid supply line fitting 140 may be a two-part fitting in which the hose barb fitting 144 is threadably separable from the male threaded fitting 142 permitting an orifice disc 200 to be positioned between the fittings 144, 142 to restrict the rate and/or volume of flow of liquid from the liquid supply line 160. Similarly, the gaseaous supply line fitting 150 may be a two-part fitting in which the hose barb fitting 154 is threadably separable from the male threaded fitting 152 permitting an orifice disc 200 to be positioned between the fittings 154, 152 to restrict the rate and/or volume of flow of gas from the gas supply line 170. Orifice 200 disc is generally circular in shape and is compressed between one or more gaskets between the fittings 142/144, 152/154. Near the middle of orifice disc 200 is an orifice 202 having a diameter between approximately 0.05 inches to approximately 0.15 inches, or between approximately 0.06 inches to approximately 0.105 inches. The orifice disc 200 may be removed and replaced by unthreading the fittings 142/144, 152/154 and seating a new orifice disc 200 with a differently sized orifice 202 if needed.

Use of an orifice disc 200 provides several advantages over conventional systems. First, flow rate and/or volume is controlled at or near the knife 10 instead of some distance away, such as at a central manifold of an anhydrous supply system. This allows for the supply lines to be as short in length as possible while still delivering uniform flow rates across all knives, whereas the current practice is to have all supply lines to each of the knives substantially equal in length to ensure uniform flow rates across all knives. Another advantage of including an orifice disc 200 is increased pressure near the discharge end 106 of primary chamber 100. Such increased pressure helps the ammonia to remain in substantially liquid form, thereby improving flow-rate consistency.

Referring again to FIG. 7, a supply tube 190 extends through the primary chamber 100 for conveying liquid ammonia through the primary chamber 100 to the discharge end 106. The supply tube 190 has a diameter less than the diameter of the primary chamber 100 such that the outer wall of the supply tube 190 is in a spaced relation to the walls 102 defining the primary chamber 100 through the knife body 50, thus creating a gap or space 192 between the walls of the supply tube 190 and the walls 102 of the primary chamber 100. This gap 192 serves as air film or air barrier to insulate the rest of knife body 50 from the ammonia helping to keep the knife body warm minimizing the likelihood of buildup of frozen soil on the knife 10. Vent gas from the anhydrous ammonia supply passes through gas supply line 170, gas supply line fitting 150, and port 112 before entering secondary passage 110. The vent gas then passes between supply tube 190 and the walls 102 of the primary chamber 100 before discharging into the furrow. Thus, in this embodiment, the vent gas and liquid ammonia is combined within the primary chamber 100, while still maintaining the ability to act as a "warm knife" to prevent freezing of the knife 10.

Figure 8:
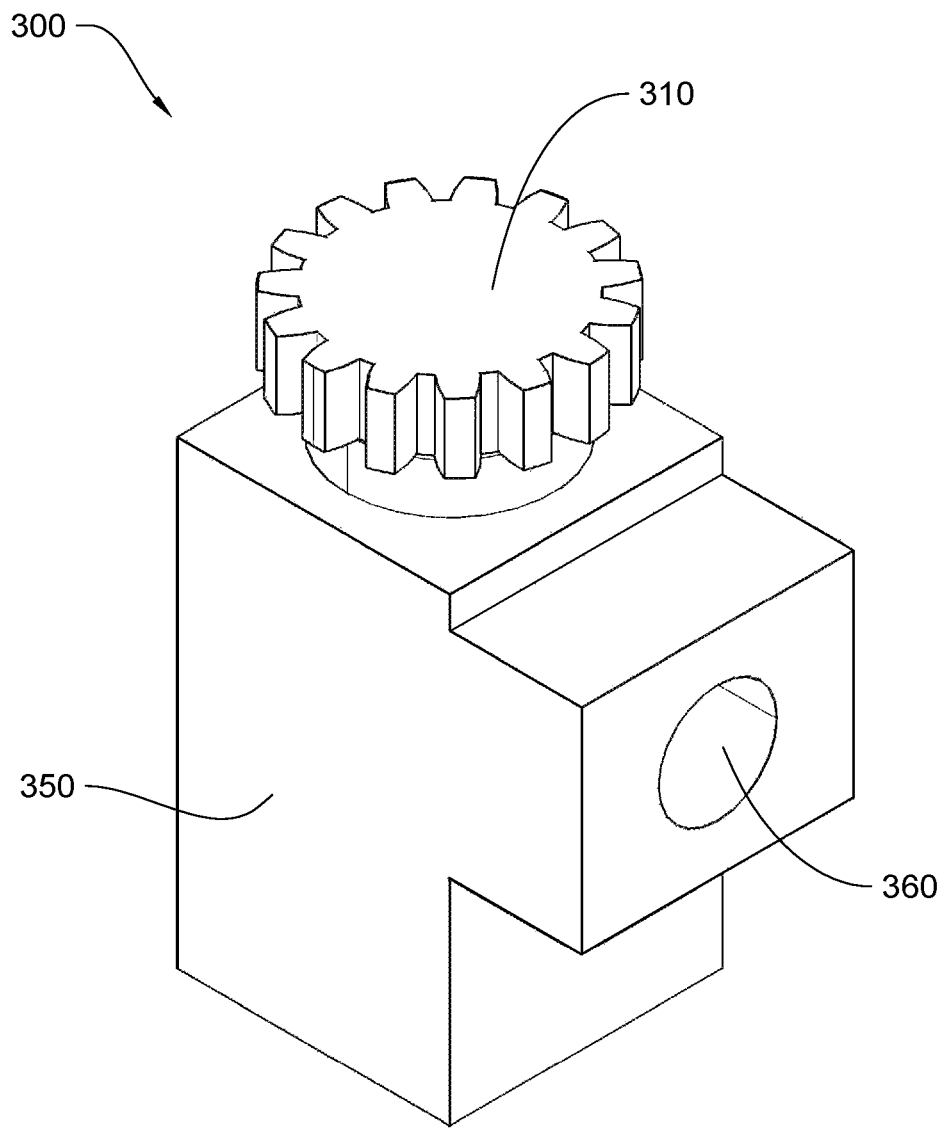
FIG. 8 is a perspective view of an embodiment of a variable orifice valve.
Figure 9:
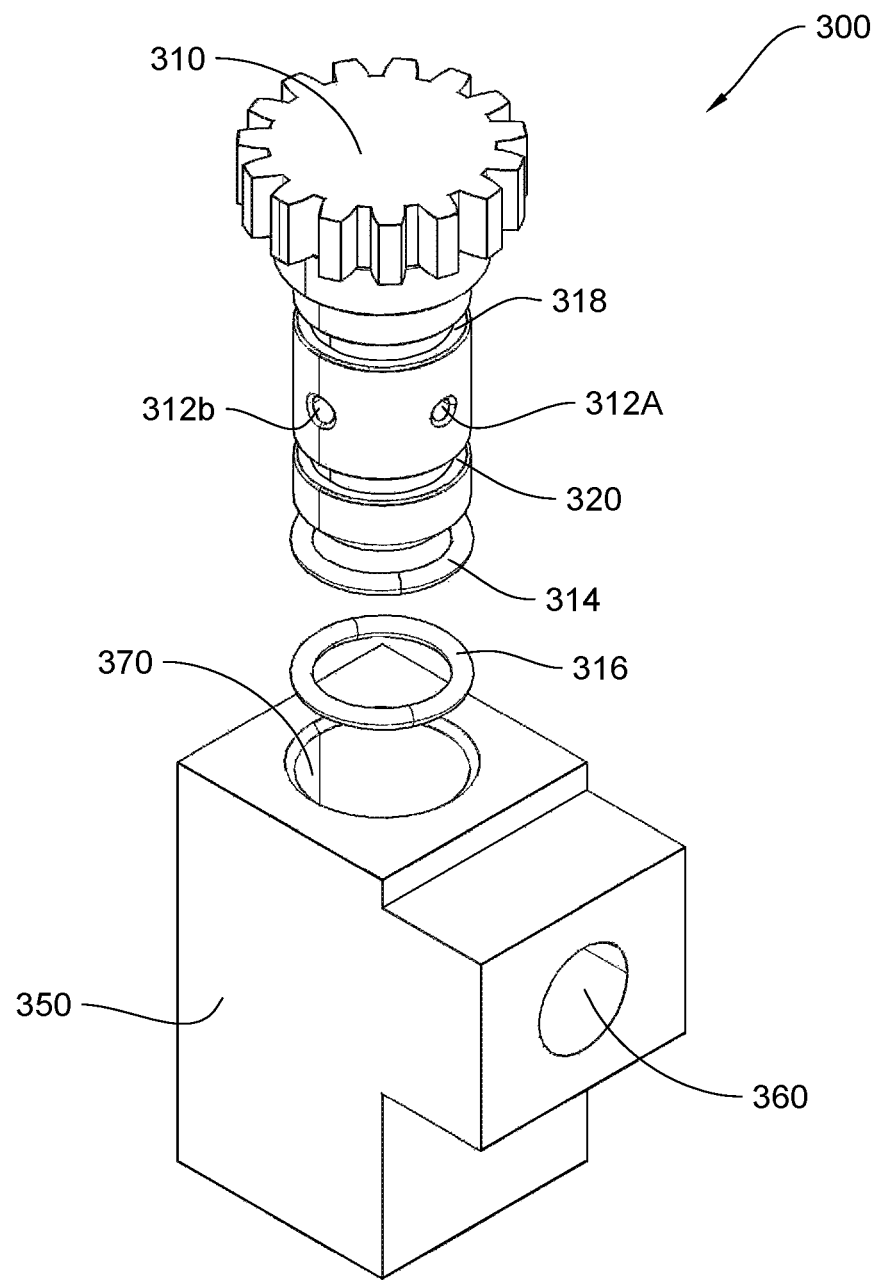
FIG. 9 is an exploded perspective view of the valve of FIG. 8.

Referring now to FIGS. 8 and 9, a variable orifice valve 300 is illustrated generally. Valve 300 is typically paired with one or more knives 10. For example, if a tillage implement has twelve knives 10, it may have twelve associated valves 300. In one example, variable orifice valve 300 replaces orifice disc 200. Alternatively, valve 300 may be used in conjunction with orifice disc 200. Valve 300 allows for rapid adjustment of the rate and/or volume of flow of a liquid. Such adjustment can be effected manually by a user or automatically in a closed or open loop system.

In one example, valve 300 comprises a metering stem 310 and a valve body 350. Metering stem 310 is positioned within a stem port 370 of valve body 350. Valve body 350 has an inlet 360 and an outlet 380 (shown in FIGS. 10 and 12). In this example, inlet 360 is formed from a sidewall of valve body 350 and extends at roughly 90 degrees relative to the axis of stem port 370. A supply hose in communication with an anhydrous ammonia supply system provides a predominately liquid supply of anhydrous ammonia into the valve 300 through inlet 360.

FIG. 9 is an exploded perspective view of variable orifice valve 300. Metering stem 310 has at least one orifice 312a and in another example has two orifices 312a, 312b each positioned substantially equidistantly near the longitudinal axis of the stem 310 and extending through a sidewall of stem 310 into a stem channel 322. O-rings 314, 316 are seated within annular recesses 318 and 320 respectively for a sealed placement of stem 310 within stem port 370 of body 350. In another example, stem 310 may be biased downwardly into the valve body 300, such as by a compression spring (not shown).

Figure 10:
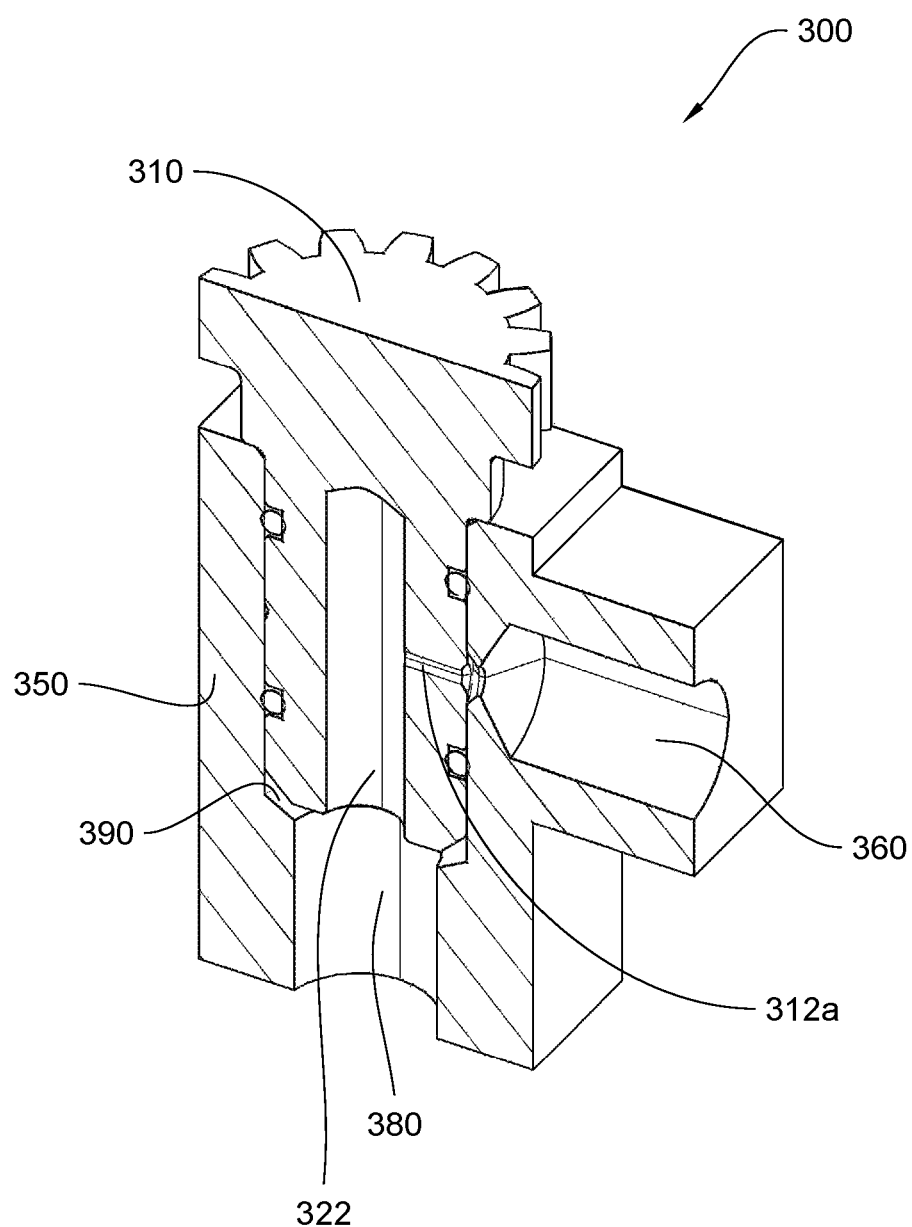
FIG. 10 is a cross-sectional view of the valve in FIG. 8.
Figure 13:
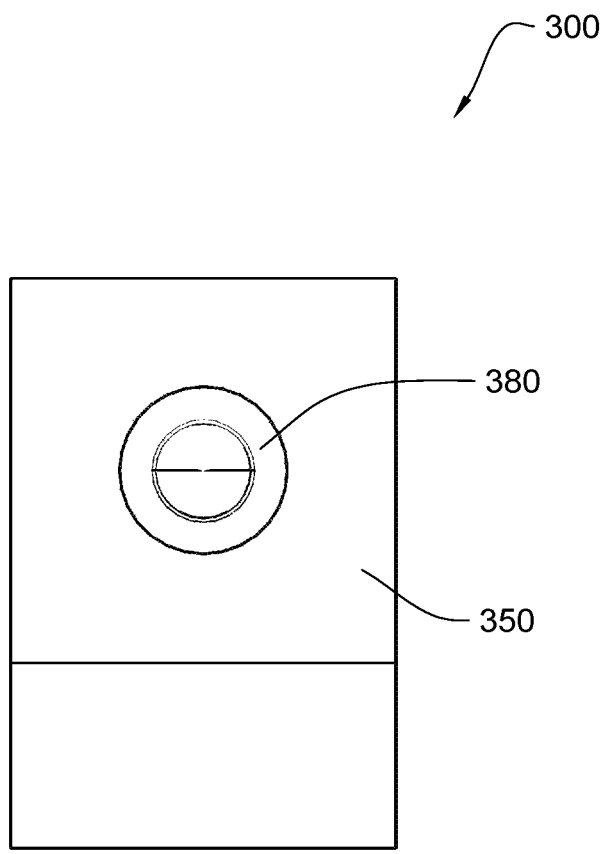
FIG. 13 is a bottom view of the valve in FIG. 8.
Figure 14:
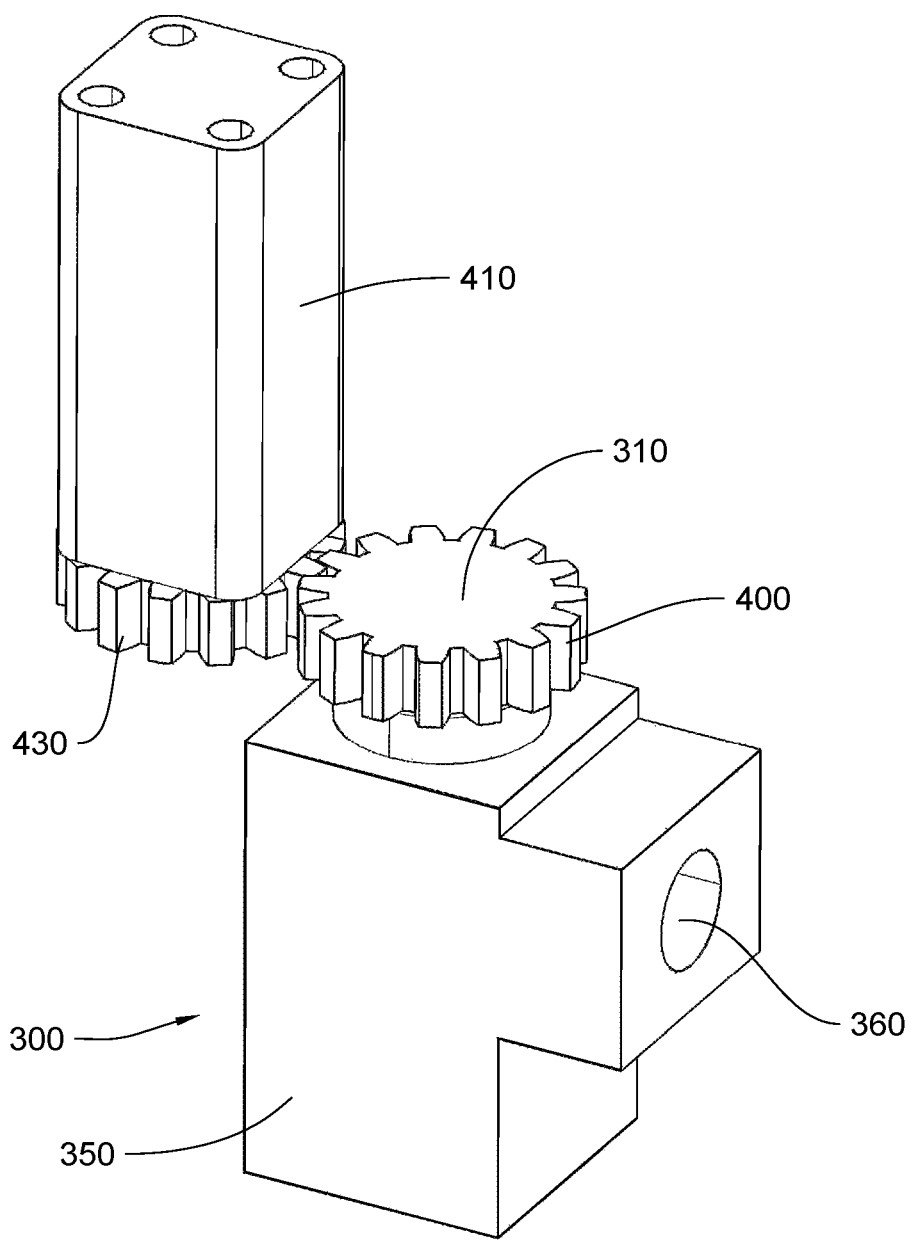
FIG. 14 is a perspective view of an embodiment of an automated variable orifice valve.

In operation, as can be seen in FIG. 10, stem 310 is rotatable about the axis of stem 310 within valve body 350 such that orifice 312a may be positioned proximate an inlet 360. Liquid product is then supplied into the valve 300 by passing through inlet 360, then through orifice 312a, then into stem channel 322 and finally exiting by way of outlet 380. Orifices 312a, 312b may each have a different size or shape such that the flow rate of liquid product exiting valve 300 through outlet 380 (best shown in FIGS. 10 and 13) can be changed manually by a user or mechanically (as shown in FIG. 14) depending on the needs of the liquid product application. For example, orifice 312a, 312b may have a diameter ranging from approximately 0.05 inches to approximately 0.15 inches. In another example, stem 310 has three orifices of the following size diameters: approximately 0.070 inches, approximately 0.080 inches and approximately 0.095 inches.

Figure 11:
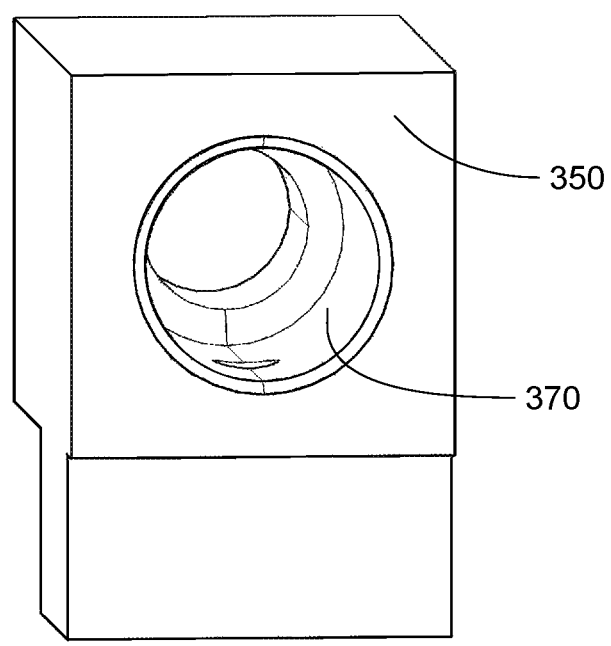
FIG. 11 is a top perspective view of the valve in FIG. 8.
Figure 12:
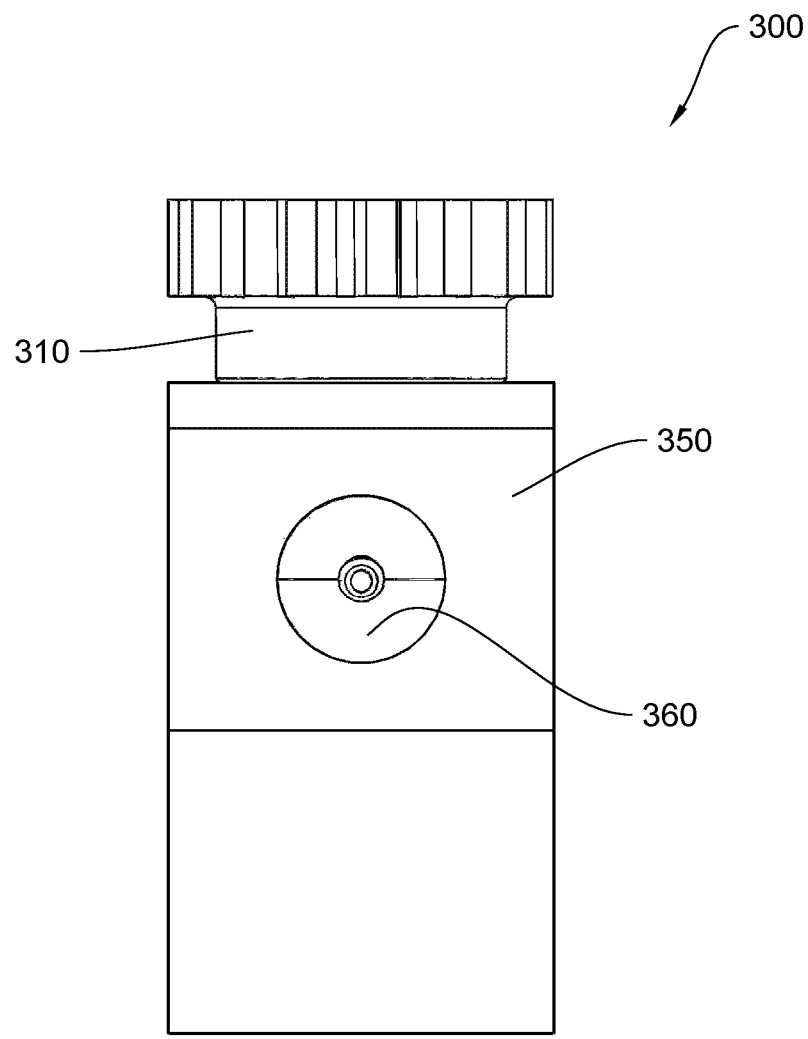
FIG. 12 is a side view of the valve in FIG. 8.

Referring again to FIG. 10, inlet 360 varies in diameter along its length, with its narrowest diameter occurring through a sidewall of stem port 370. In one example, inlet 360 has a threaded end into which a male hose barb (not shown) may be threaded. Stem port 370 transitions into outlet 380 along chamfered edge 390. Stem port 370 has a larger diameter than outlet 380 in one example. FIGS. 11-13 show in detail other aspects of valve 300. As illustrated in FIG. 11, stem port 370 is positioned about the longitudinal axis of valve body 350. Outlet 380 allows the ammonia to flow out of the valve body 350 to knife 10.

One example of an automated valve 300 is shown in FIG. 14. Valve 300 again includes a metering stem 310 but this time has a top portion 400 with a plurality of teeth along a circumferential edge. An edge drive 410 is provided to engage and drive a circumferential edge of a top portion of stem 310. Edge drive is electrically powered and may in one example be a solenoid with an output shaft (not shown) and a drive gear 430. Drive gear 430 engages with the circumferential edge of the top portion 400 to rotate or drive the top portion 400 to one or more positions, each position corresponding to a different orifice on the metering stem 310 or combinations thereof. Edge drive 410 and valve 300 may be positioned within in an enclosure proximal to knife 10 to protect it from debris, dirt or other field hazards. In one example, the position of drive gear 430 is sensed to determine the position of the output shaft (not shown) and respectively drive gear 430. In this manner, the position of the shaft can be used to determine the corresponding position of metering stem 310 and the positions of each orifice thereon.

Drive 400 may further communicate with a control system, which may include a rate controller (not shown) and a display monitor, associated with the anhydrous ammonia supply system. In some embodiments, the control system is additionally in data communication (as, for example, by an Internet connection) with a server. In such embodiments, the control system operated by a user may transmit application data to the server and also simultaneously receive data from the server. In one example, the data received from the server includes an application prescription map and the data transmitted to the server includes, among other things, control system setup information and as-applied data. The prescription map may correspond to a file, such as, for example, a shapefile, stored in the memory of the control system. The shapefile may contain one or more zones, with each zone comprising a polygon with a set of geo-referenced locations (e.g., GPS vertices) within a field. Each zone is preferably associated with an application rate stored in the memory of the control system. In this manner, the chive 400 may receive commands from the control system based on the zone and associated application rate as the implement passes through the a zone.

The details and features of the disclosed embodiments are not intended to be limiting, as many variations and modifications will be readily apparent to those of skill in the art. Accordingly, the scope of the present disclosure is intended to be interpreted broadly and to include all variations and modifications coming within the scope of the appended claims and their legal equivalents.

The invention claimed is:

1. A fertilizer knife, comprising:
   a knife body having an upper end, a lower end, a forward end, a rearward end and opposing sides;
   a primary chamber disposed through the rearward end of the knife body, the primary chamber having an input port proximate the upper end of the knife body and a discharge end proximate the lower end of the knife body;
   a fin beginning at a tip at the lower, forward end of the knife body and diverging laterally outwardly along each of the opposing sides toward the rearward end, the fin curving upwardly along each of the opposing sides before terminating proximate the rearward end and above the discharge end of the primary chamber.

2. The fertilizer knife of claim 1, further comprising:
   a supply tube disposed through the primary chamber, the supply tube having a diameter less than a diameter of the primary chamber thereby defining a gap between the supply tube and walls of the primary chamber.

3. The fertilizer knife of claim 2, further comprising:
   a liquid fitting connecting the supply tube disposed within the primary chamber to a liquid supply hose, the liquid supply hose communicating liquid from a supply source.

4. The fertilizer knife of claim 3, further comprising:
   a secondary passage branching from the primary chamber through the knife body, the secondary passage having an inlet end and an outlet end, the outlet end in communication with the gap around the supply tube disposed within the primary chamber;
   a gas fitting connecting the inlet end to a gas supply hose, the gas supply hose communicating gas from a gas supply source.

5. The fertilizer knife of claim 4 wherein the primary chamber and the secondary passage are cast into the knife body.

6. The fertilizer knife of claim 4, wherein the gas fitting includes an orifice disc for regulating gas flow into the secondary passage from the gas supply source.

7. The fertilizer knife of claim 4, wherein the gas fitting includes a variable orifice valve for regulating gas flow into the secondary passage from the gas source.

8. The fertilizer knife of claim 3, wherein the liquid fitting includes an orifice disc for regulating liquid flow into the supply tube from the liquid source.

9. The fertilizer knife of claim 3, wherein the liquid fitting includes a variable orifice valve for regulating liquid flow into the supply tube from the liquid source.

10. The fertilizer knife of claim 1 wherein the primary chamber is cast into the knife body.

11. The fertilizer knife of claim 1, further comprising:
    a deflector disposed at the lower, rearward end of the knife body and below the discharge end of the primary chamber.

* * * * *